Patented June 19, 1934

1,963,109

UNITED STATES PATENT OFFICE 1,963,109

PREPARATION OF HALOGENATED BENZOYL-AMINO-ANTHRAQUINONE

Alexander J. Wuertz, Wilmington, Del., assignor to E. I. du Pont de Nemours & Company, Wilmington, Del., a corporation of Delaware No Drawing. Application July 24, 1929, Serial No. 380,761

21 Claims. (Cl. 260—60)

This invention relates to a method of preparing halogenated benzoyl-amino-anthraquinones and more particularly a method of preparing 1-benzoyl-amino-4-chlor-anthraquinone by a process in which the benzoylation and chlorination are combined in a single step.

The halogenation of acyl- and benzoyl-amino-anthraquinones is discussed in the prior art, particularly in U. S. Patent 1,401,125, in British Patent 173,805, and in German Patent 199,758. In general, the said patents describe the halogenation of the benzoyl-amino-anthraquinones as of necessity requiring at least a two stage process comprising as a first step thereof the benzoylation of amino-anthraquinones followed by the separation of the benzoylated amino-anthraquinone, and as a second stage of the process the chlorination of the benzoyl-amino-anthraquinone in acetic acid. The chlorination of the suspension of benzoyl-amino-anthraquinone while suspended in acetic acid takes place only in the presence of iodine as a catalyst.

My invention has for an object the preparation of halogenated benzoyl-amino-anthraquinones in a single operation. A further object of my invention is the elimination of the necessity of using iodine as a catalyst, and a still further object is to obtain a process in which the halogenation is readily controlled and in which a higher yield of a pure product is obtained.

I have found that an amino-anthraquinone may be benzoylated while dissolved in a suitable organic solvent, and that after the benzoylation step and without removing the benzoylated amino-anthraquinone from the suspension, the solvent may be diluted by acetic acid and the halogenation carried out in the presence of the mixed solvents.

*Example 1.*—By way of example of my invention, I may dissolved alpha-amino-anthraquinone in approximately 3 parts of nitro benzene and benzoylate the anthraquinone at an elevated temperature of 140 to 160° C. The pasty benzoyl body may then be cooled to about 120 to 130° C. and diluted with acetic acid, the amount approximating the amount of nitro benzene originally used. To this suspension may be added from ½ to ¾ of a part of anhydrous sodium acetate (based on the weight of alpha-amino-anthraquinone), and chlorine is then passed through the suspension held at a temperature of about 95 to 110° C. until the required amount of chlorine has been introduced. This may be determined by withdrawing a sample of the solution and analyzing the chlorinated product. The product may then be cooled to 20 to 30° C., filtered and washed once with acetic acid, washed with either cold or hot water, and dried.

*Example 2.*—100 parts of alpha-amino-anthraquinone are suspended in 300 parts of a nitro benzene and heated to 140 to 150° C. While maintaining this temperature, 60 to 70 parts of benzoyl chloride are slowly added over a period of say from 2 to 3 hours. When all of the benzoyl chloride has been added, the heating is continued at 150 to 160° C. for at least one hour, the charge is then cooled to 120 to 130° C., and the pasty mono-benzoyl-amino-anthraquinone nitro benzene mixture is diluted with 300 parts of glacial acetic acid and immediately 50 to 75 parts of anhydrous sodium acetate are added. The temperature is now adjusted to 90 to 120° C. and a slow stream of chlorine is passed through this suspension until an aliquot sample, by quantitative analysis shows the desired chlorine content. The chlorination may be completed within two hours, though I have found it better to proceed cautiously and complete the reaction within from 4 to 6 hours.

*Example 3.*—100 parts of alpha-amino-anthraquinone are added to a mixture of 300 parts of nitro benzene and 60 to 70 parts of benzoyl chloride. The mixture is heated to 150 to 160°, and this temperature is maintained for a period of 2 to 3 hours. The charge is cooled to 120 to 130° C., and then finished in the same manner as in Example 2.

*Example 4.*—100 parts of 1-benzoyl-amino-anthraquinone and 50 to 75 parts of anhydrous sodium acetate are suspended in a solvent mixture of 300 parts of glacial acetic acid and 300 parts of nitro benzene. The suspension is heated to 90 to 110° C. and, preferably, with good agitation, a stream of chlorine is passed through the reaction mixture at such a rate that the required quantity of chlorine may be introduced within a period of from 4 to 6 hours. The endpoint of the chlorination may be determined by means of a microscopic examination of the product, observing the change in the crystalline form, or by means of a quantitative estimation of the chlorine content. When the chlorination has been completed the charge is cooled to 20 to 30° C., filtered and washed first with a small amount of acetic acid, and then with either hot or cold water.

The halogenated benzoyl-amino-anthraquinones obtained by the above procedure are of the highest purity; in the case of 1-benzoyl-amino-4-chlor-anthraquinone the crystals consist of long, yellow needles having a chlorine content not varying more than 0.1 to 0.3% from the theoretical chlorine content.

It is to be understood that the examples given here above are described for the purposes of illustration, and are not to be limited to the precise conditions or the precise compounds described in the examples.

It is possible to carry out the halogenation step in a liquid medium consisting of 1-chlorbenzene and acetic acid, as well as trichloroethylene and acetic acid. In each case the benzoylation step should be conducted before the addition of the acetic acid. I prefer, however, to employ as my preferred liquid medium a mixture of nitro benzene and acetic acid.

My invention offers certain distinctive advantages over anything in the prior art. For example, the chlorination of 1-benzoyl-amino-anthraquinone in nitro benzene as the sole solvent or suspension agent is much too rapid, and is attended by more or less uncontrollable fluctuations both in regard to the yield and the quality of the finished product. On the other hand, when acetic acid is used as the sole solvent or suspension medium for the chlorination step, the chlorination even in the presence of iodine as a catalyst and sodium carbonate as a neutralizing agent is much too slow. Moreover, the amount of acetic acid necessary to effect the chlorination may run as high as 15 to 20 parts, based on the weight of the 1-benzoyl-amino-anthraquinone used, and the product thus obtained requires a purification from some other solvent, such as nitro benzene or dichlor-benzene.

My invention combines the benzoylation and the chlorination steps into one continuous operation in such a manner as to take advantage of the effect of nitro benzene and acetic acid which together moderate the chlorination and, furthermore, make it possible to use anhydrous sodium acetate as a neutralizing agent for such hydrochloric acid gas as may be formed in the reaction.

This is an unexpected result inasmuch as the prior art, as exemplified in the British and United States patents referred to at the outset of this specification, clearly states that sodium acetate is not a suitable agent to employ under the conditions which are here specified. It is, of course, possible to use other neutralizing agents, such as alkali and basic salts adapted to neutralize the hydrochloric acid or other halogen acid formed by the process, though I prefer to use anhydrous sodium acetate. Moreover, bromine may be used as the halogenating medium in lieu of chlorine, in order to obtain the bromine derivative.

An additional advantage offered by my invention is the elimination of two separate steps heretofore necessary in a synthesis of halogenated benzoyl-amino-anthraquinone, namely, the isolation of the benzoyl body after benzoylation, and the subsequent purification of the halogenated product after halogenation. My invention, moreover, eliminates the necessity of using iodine as a catalyst in the chlorination step. My invention has resulted in the speediest process known to me, gives uniform results, is easily controlled, and produces a high yield of a product of excellent quality. It moreover effects a marked saving in the amount of solvents necessarily employed.

As many apparently widely different embodiments of this invention may be made without departing from the spirit thereof, it is to be understood that I do not limit myself to the foregoing examples or descriptions except as indicated in the following patent claims.

I claim:

1. The process of making a halogenated derivative of a benzoyl-amino-anthraquinone which comprises treating a benzoyl-amino-anthraquinone with a halogen in the presence of acetic acid diluted with a chloro-benzene.

2. The process of making a chlor derivative of a benzoyl-amino-anthraquinone which comprises treating a benzoyl-amino-anthraquinone with chlorine in the presence of acetic acid diluted with a chloro-benzene.

3. The process of making a chlor derivative of a benzoyl-amino-anthraquinone which comprises treating a benzoyl-amino-anthraquinone with chlorine in the presence of acetic acid diluted with nitro-benzene.

4. The process of making 1-benzoyl-amino-4-chlor-anthraquinone which comprises treating 1-benzoyl-amino-anthraquinone with chlorine in the presence of acetic acid diluted with nitro-benzene.

5. The process of making a halogenated derivative of a benzoyl-amino-anthraquinone which comprises treating with halogen a benzoyl-amino-anthraquinone dissolved in a solution containing acetic acid diluted with a solvent taken from the class consisting of nitrobenzene, chloro-benzene and tri-chloro-ethylene and containing an agent adapted to neutralize any halogen acid formed in the reaction.

6. The process of making a chlor derivative of a benzoyl-amino-anthraquinone which comprises treating with chlorine a benzoyl-amino-anthraquinone suspended in a solution containing acetic acid diluted with a solvent taken from the class consisting of nitrobenzene, chlorobenzene and tri-chloro-ethylene and containing an agent adapted to neutralize any hydrochloric acid formed in the reaction.

7. The process of making a chlor derivative of a benzoyl-amino-anthraquinone which comprises treating with chlorine a benzoyl-amino-anthraquinone suspended in a solvent mixture containing acetic acid diluted with nitro-benzene and containing an agent adapted to neutralize any hydrochloric acid formed in the reaction.

8. The process of making 1-benzoyl-amino-4-chlor-anthraquinone which comprises treating with chlorine 1-benzoyl-amino-anthraquinone suspended in a solvent mixture containing acetic acid diluted with nitro-benzene and containing sodium acetate.

9. The process of making 1-benzoyl-amino-4-chlor-anthraquinone which comprises treating with chlorine 1-benzoyl-amino-anthraquinone suspended in a solvent mixture containing glacial acetic acid, nitro-benzene and anhydrous sodium acetate.

10. The process of making a halogen derivative of a benzoyl-amino-anthraquinone which comprises benzoylating an amino-anthraquinone in a solvent taken from the class consisting of nitro-benzene, chlorobenzene and tri-chloro-ethylene, adding acetic acid, and treating the benzoyl-amino-anthraquinone, while suspended in the mixed solvents, with a halogen.

11. The process of making a chlor derivative of a benzoyl-amino-anthraquinone which comprises benzoylating an amino-anthraquinone in a solvent taken from the class consisting of nitro-benzene, chlorobenzene and tri-chloro-ethylene, adding acetic acid, and treating the benzoylamino-anthraquinone, while suspended in the mixed solvents, with chlorine.

12. The process of making a chlor derivative of a benzoyl-amino-anthraquinone which comprises benzoylating an amino-anthraquinone in nitro-benzene, subsequently adding acetic acid, and treating the benzoyl-amino-anthraquinone, while dissolved in the mixed solvents, with chlorine.

13. The process of making 1-benzoyl-amino-4-chlor-anthraquinone which comprises benzoylating alpha-amino-anthraquinone dissolved in nitro benzene, subsequently adding acetic acid, and treating the benzoyl-amino-anthraquinone, while suspended in the mixed solvents, with chlorine.

14. The process of making 1-benzoyl-amino-4-chlor-anthraquinone which comprises benzoylating alpha-amino-anthraquinone dissolved in nitro-benzene, subsequently adding glacial acetic acid, and treating the benzoyl-amino-anthraquinone, while suspended in the mixed solvents, with chlorine.

15. The process of making a halogen derivative of a benzoyl-amino-anthraquinone which comprises benzoylating amino-anthraquinone dissolved in a solvent taken from the class consisting of nitrobenzene, chlorobenzene and tri-chloro-ethylene, subsequently adding acetic acid, and treating the benzoyl-amino-anthraquinone, while suspended in the mixed solvents, with a halogen in the presence of a substance adapted to neutralize any halogen acid formed in the reaction.

16. The process of making a chlor-derivative of a benzoyl-amino-anthraquinone which comprises benzoylating an amino-anthraquinone dissolved in a solvent taken from the class consisting of nitrobenzene, chlorobenzene and tri-chloro-ethylene, subsequently adding acetic acid, and treating the benzoyl-amino-anthraquinone, while suspended in the mixed solvents, with chlorine in the presence of a substance adapted to neutralize any hydrochloric acid formed in the reaction.

17. The process of making a chlor-derivative of a benzoyl-amino-anthraquinone which comprises benzoylating an amino-anthraquinone dissolved in nitro-benzene, subsequently adding acetic acid, and treating the benzoyl-amino-anthraquinone, suspended in the mixed solvents, with chlorine in the presence of a substance adapted to neutralize any hydrochloric acid formed in the reaction.

18. The process of making 1-benzoyl-amino-4-chlor-anthraquinone which comprises benzoylating alpha-amino-anthraquinone dissolved in nitro-benzene, subsequently adding acetic acid, and treating with chlorine the 1-benzoyl-amino-anthraquinone while suspended in a solvent mixture containing sodium acetate in addition to the nitro-benzene and acetic acid.

19. The process of making 1-benzoyl-amino-4-chlor-anthraquinone which comprises benzoylating alpha-amino-anthraquinone dissolved in nitro-benzene, subsequently adding glacial acetic acid and anhydrous sodium acetate, and treating 1-benzoyl-amino-anthraquinone while suspended in the mixed solvents with chlorine.

20. The process of making a halogenated derivative of a benzoyl-amino-anthraquinone which comprises treating a benzoyl-amino-anthraquinone with a halogen in the presence of acetic acid diluted with a solvent taken from the class consisting of nitro-benzene, 1-chlor-benzene, and trichloro-ethylene.

21. The process of claim 20 in which the halogen is chlorine.

ALEXANDER J. WUERTZ.